R. E. BENNER.
ADDING AND LISTING MACHINE.
APPLICATION FILED MAR. 14, 1910.
1,046,546.
Patented Dec. 10, 1912.
9 SHEETS—SHEET 4.
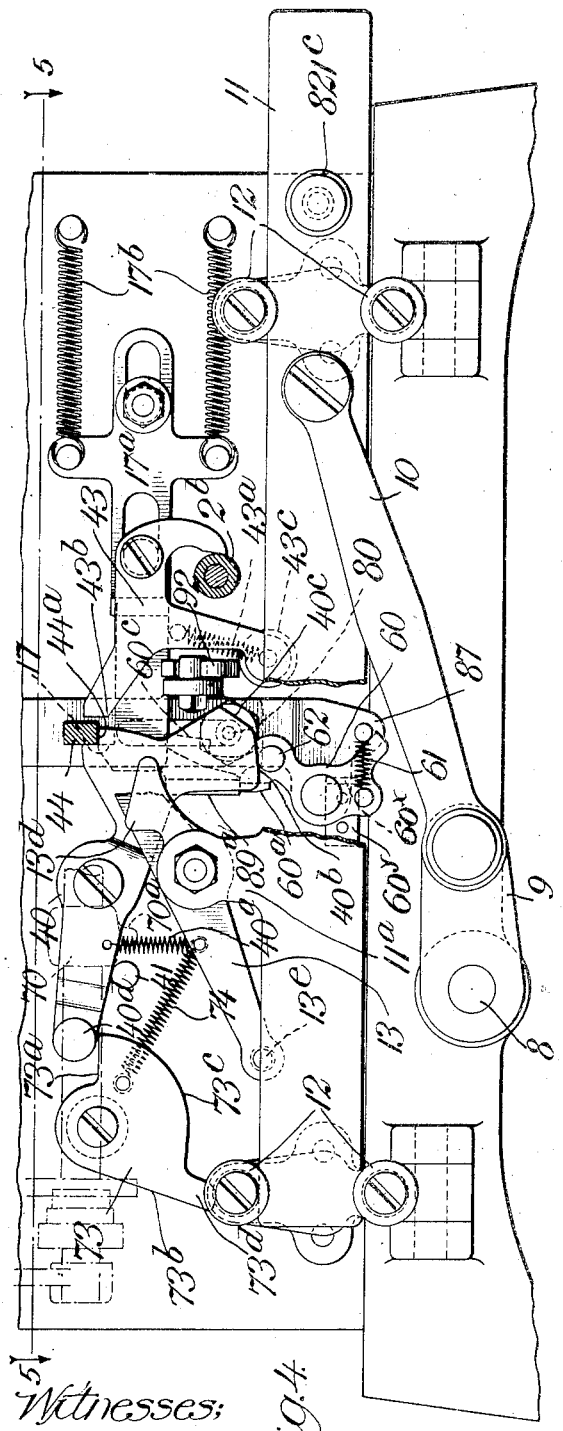
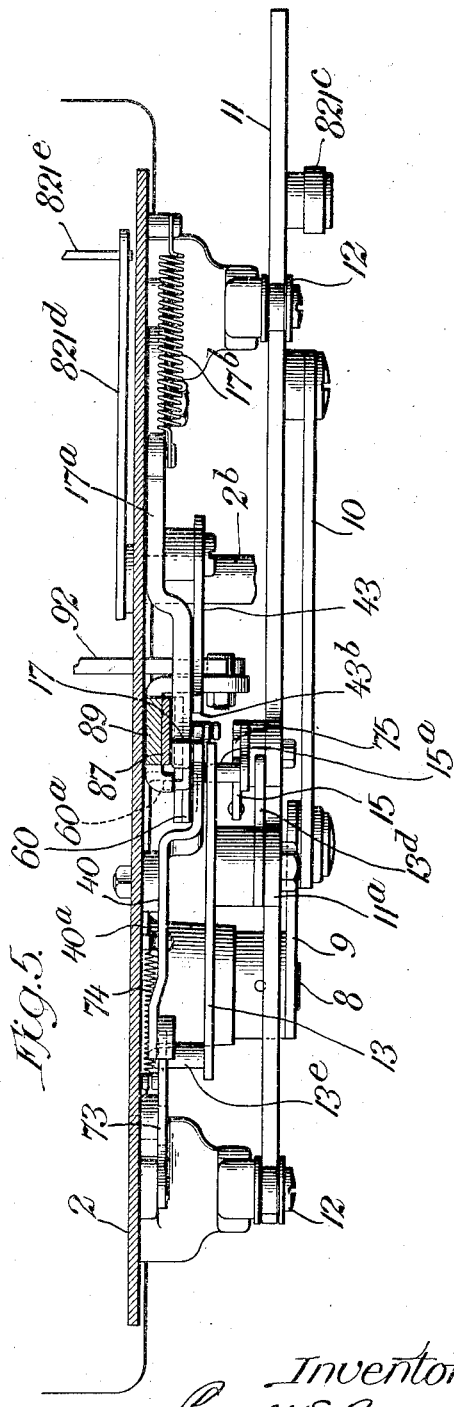
Witnesses:
E. R. Barrett
Louis B. Erwin
Inventor
Russell E. Benner
by Rector Hibben Davis
his Attys R. E. BENNER.
ADDING AND LISTING MACHINE.
APPLICATION FILED MAR. 14, 1910.
1,046,546.
Patented Dec. 10, 1912.
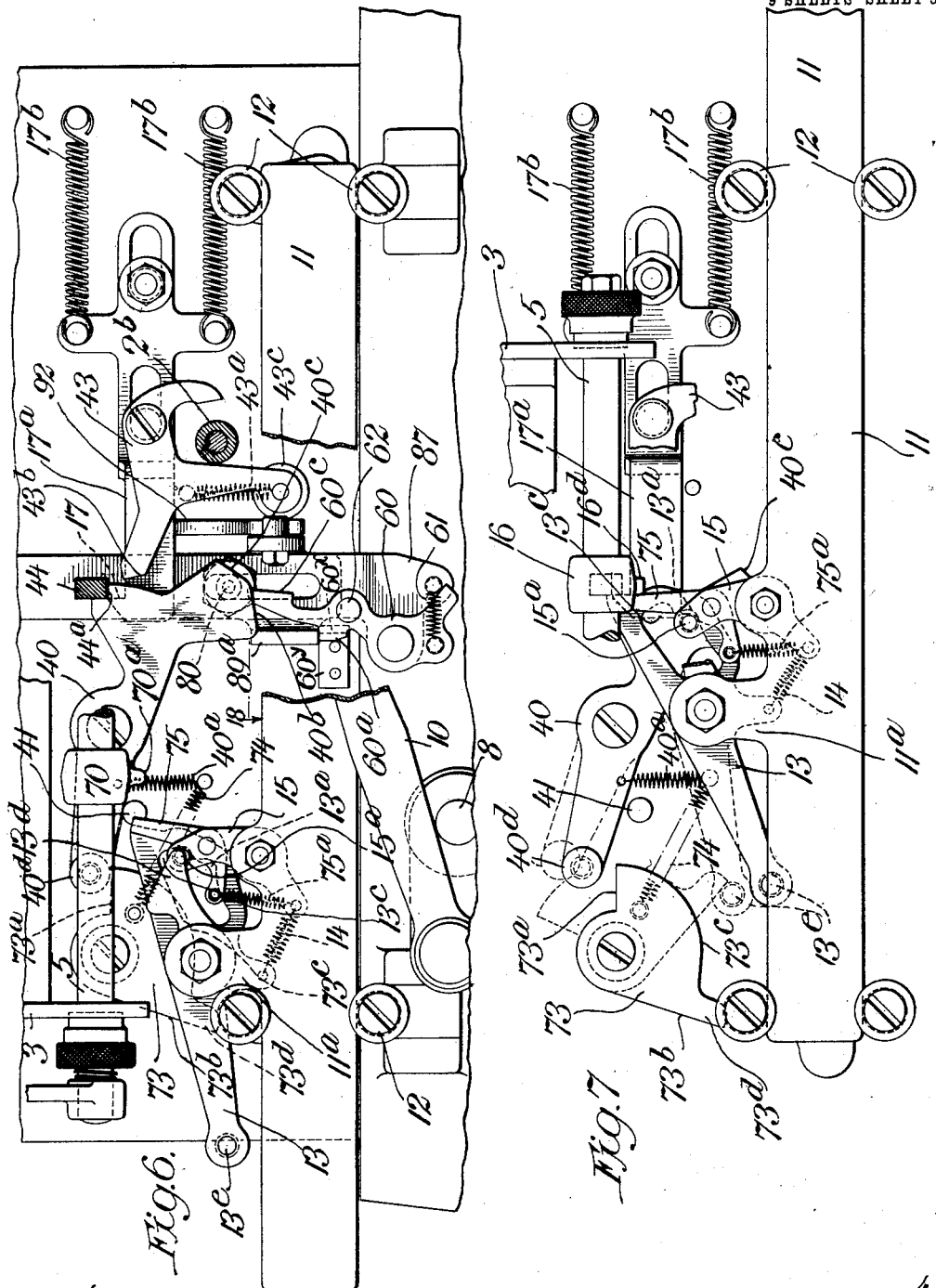

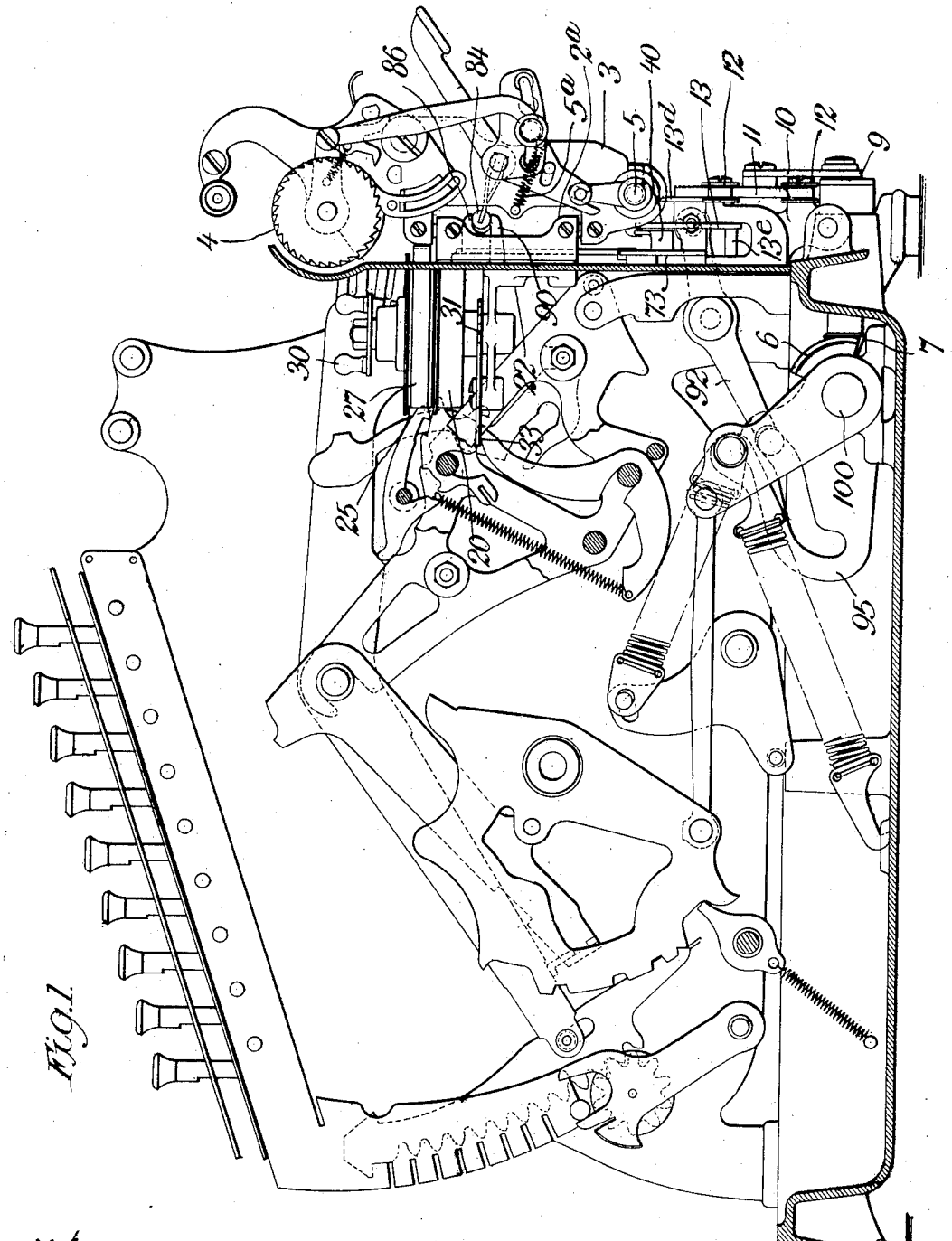

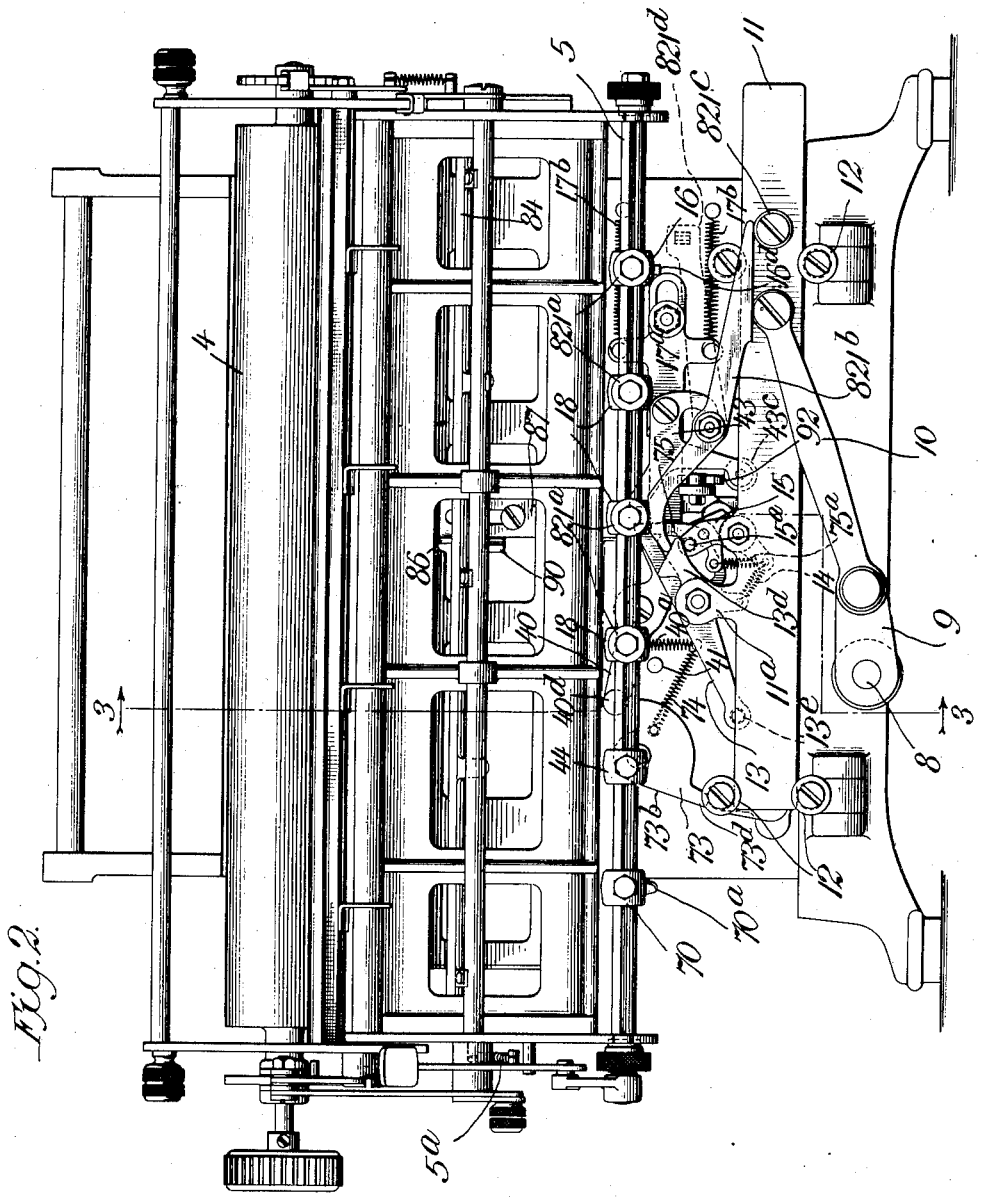

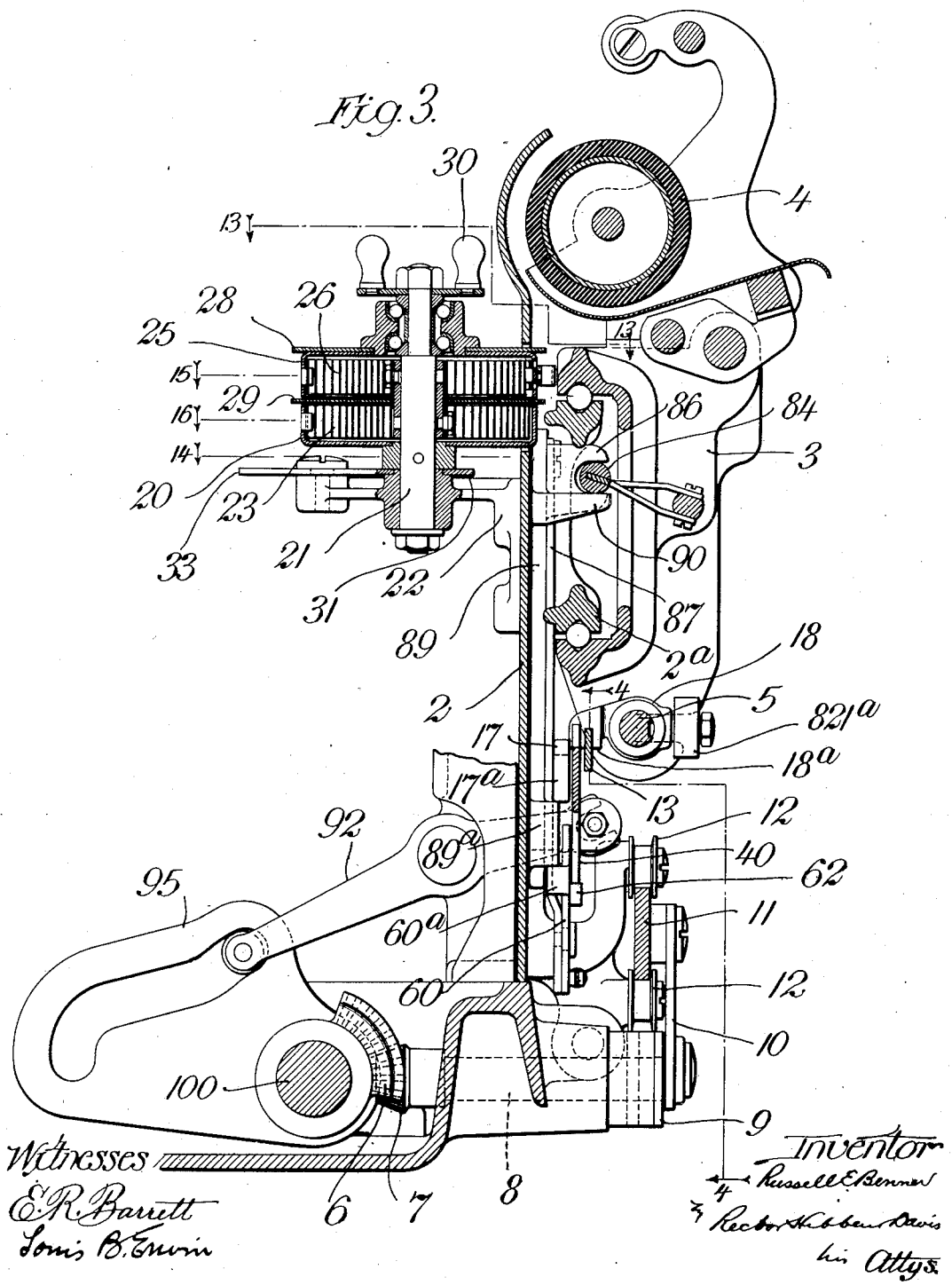

R. E. BENNER.
ADDING AND LISTING MACHINE.
APPLICATION FILED MAR. 14, 1910.
1,046,546.
Patented Dec. 10, 1912.
9 SHEETS—SHEET 6.
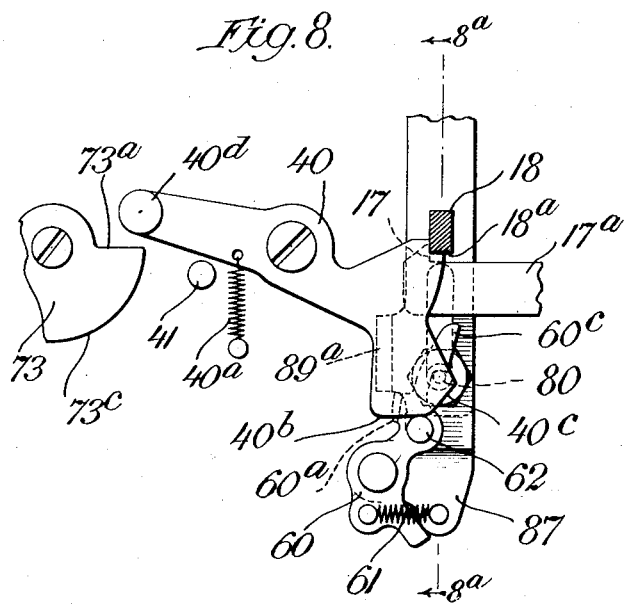
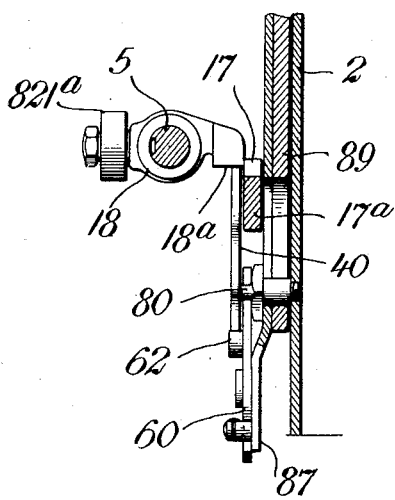
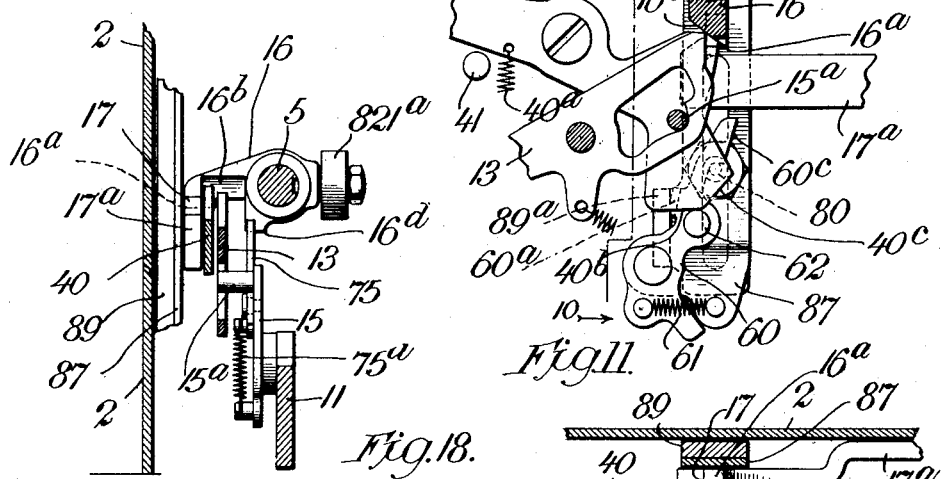
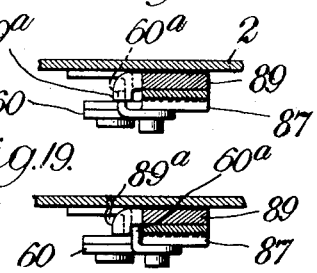
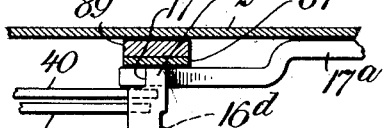

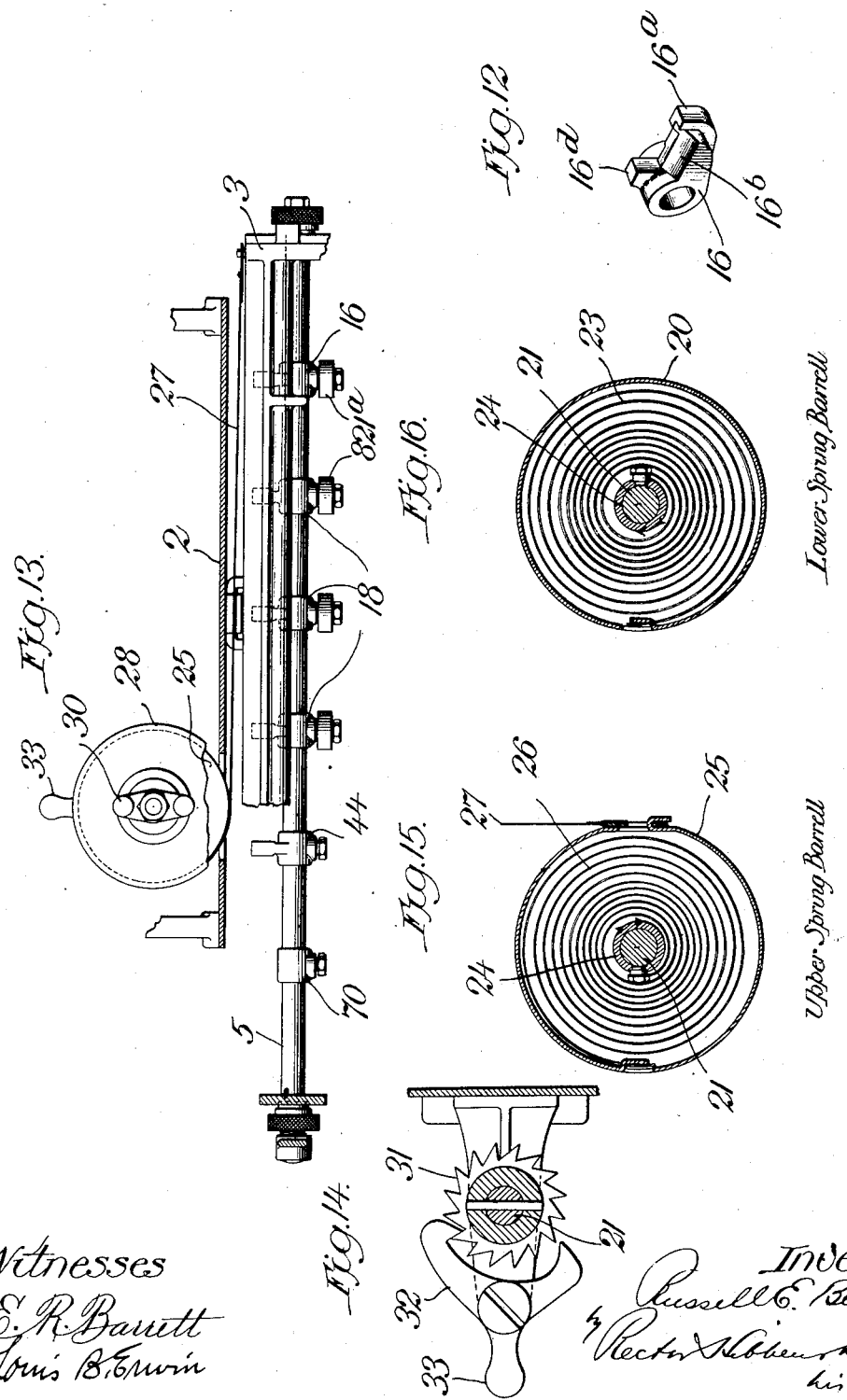

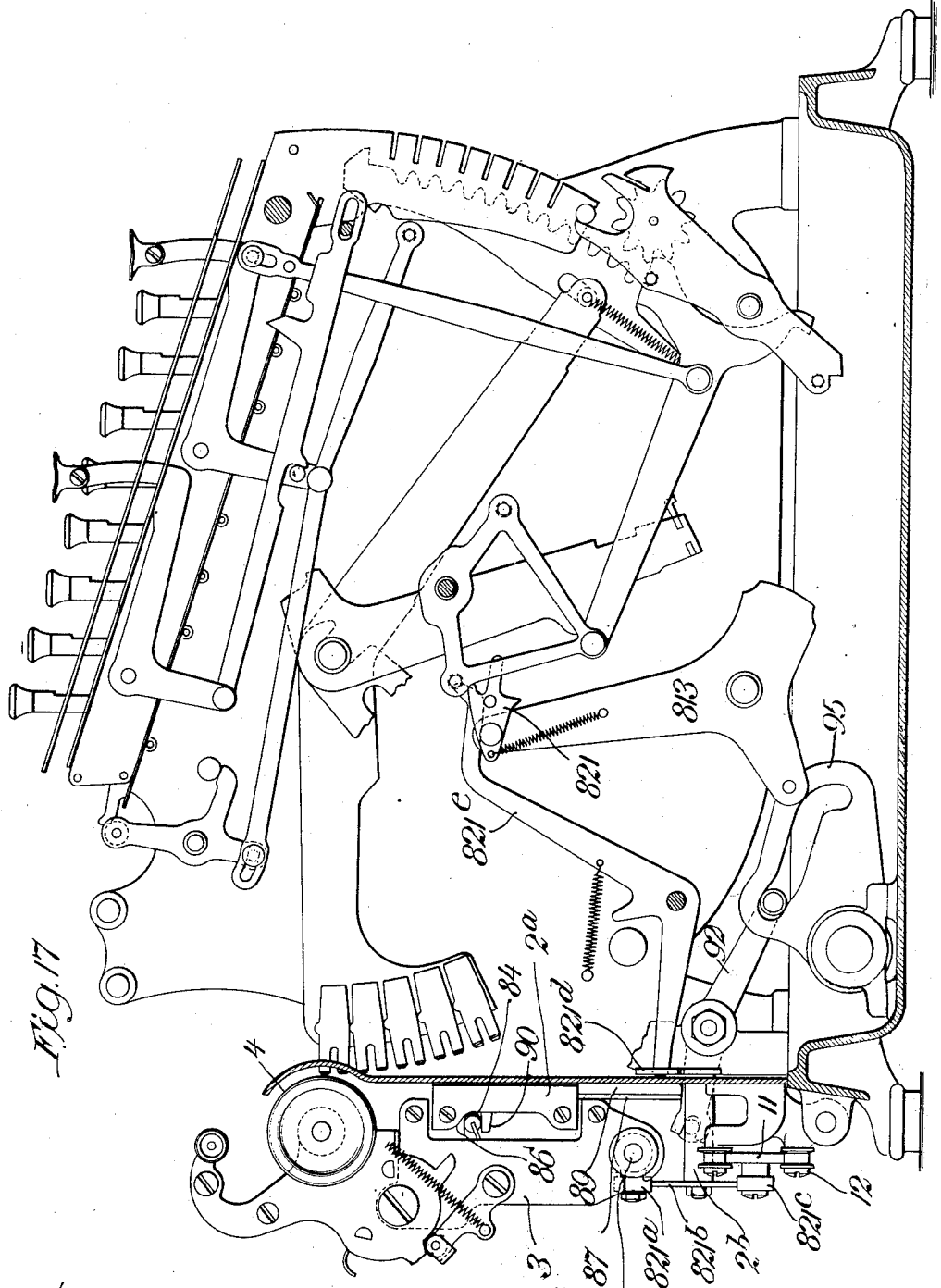

R. E. BENNER.
ADDING AND LISTING MACHINE.
APPLICATION FILED MAR. 14, 1910.

1,046,546.

Patented Dec. 10, 1912.
9 SHEETS—SHEET 9.

Fig 20.

| | | | | |
|---|---|---|---|---|
| 990033 | 978654321 | 8642014 | 97683422 | 32165420 |
| 100322 | 3203630 | 2240 | 343732 | 42135786 |
| 4678644 | 2700 | 456007 | 419300 | 3754698355 |
| 56005 | 100456 | 89960 | 6540000 | 321000 |
| 146703 | 54323 | 6522110 | 301234 | 34578 |
| 5670022 | 11000 | 65770 | 34687 | 3654467 |
| | | | | 424832203 |

Witnesses:
E. R. Barrett
Louis B. Erwin

Inventor
Russell E. Benner
by Rector Hibben Davis
his Attys.

UNITED STATES PATENT OFFICE.

RUSSELL E. BENNER, OF DETROIT, MICHIGAN, ASSIGNOR TO BURROUGHS ADDING MACHINE COMPANY, OF DETROIT, MICHIGAN, A CORPORATION OF MICHIGAN.

ADDING AND LISTING MACHINE.

1,046,546.   Specification of Letters Patent.   Patented Dec. 10, 1912.

Application filed March 14, 1910.   Serial No. 549,332.

*To all whom it may concern:*

Be it known that I, RUSSELL E. BENNER, a citizen of the United States, residing at Detroit, in the county of Wayne and State of Michigan, have invented certain new and useful Improvements in Adding and Listing Machines, of which the following is a specification.

The present invention relates to cross-tabulating equipments for adding and listing or like machines and the principal object is to provide an improved arrangement for doing such work automatically, the operator being merely required to set up amounts or numbers by depression of keys and pull the operating handle or in the case of a power-driven machine touch off the starting device. Thus by this invention it is proposed to move the paper carriage from column to column in opposition to a spring or springs and then when a predetermined number of shifts have occurred to permit the spring to return the carriage to its original position, line spacing of paper taking place only after the recording of the last amount or number in a horizontal row. Repetition of recording operations between ensuing corresponding shifts of the paper carriage will then obviously result in parallel vertical columns of imprints. The equipment of the machine for this character of work may include, and is hereinafter described as including provisions for varying effects as to space between columns and number of columns.

With the above stated and incidental objects in view the invention consists in certain novel features of construction and combinations of parts, the essential elements whereof are recited in the appended claims, and a preferred form of embodiment of which is described in detail hereinafter and fully illustrated in the accompanying drawings which form part of this specification.

Of said drawings Figure 1 represents chiefly in elevation viewed from the right-hand side, an adding and listing machine of the well-known Burroughs type equipped with a form of means for carrying out the present invention, the base casting and back panel of the machine being shown in section and the supporting side frame-piece being omitted; Fig. 2 is a rear elevation of the machine showing the paper carriage in an intermediate position; Fig. 3 is a vertical section taken substantially on the line 3—3 of Fig. 2; Fig. 4 is in part a rear elevation similar to Fig. 2, on an enlarged scale and with some parts broken away and others in section and a different condition indicated than that portrayed in Fig. 2; Fig. 5 is a horizontal section taken on line 5—5 of Fig. 4; Fig. 6 is a view similar to Fig. 4 but representing the parts as they would appear with the machine at the middle of a cycle of operation following that which put the parts in the condition shown in Fig. 4; Fig. 7 is a similar rear elevation illustrating the changed condition at the completion of such operation; Fig. 8 shows separately a portion of the mechanism illustrated in Figs. 2, 4, 6 and 7 under the same conditions as in Fig. 2; Fig. 8$^a$ is a vertical section taken on the line 8$^a$—8$^a$ of Fig. 8; Fig. 9 is a view similar to Fig. 8 but corresponding, as to position of carriage, with Fig. 7; Fig. 10 is a section taken substantially on the line 10—10 of Fig. 9; Fig. 11 is a section taken on the line 11—11 of Fig. 9; Fig. 12 is the bottom perspective view of a certain carriage stop member which appears in Figs. 9, 10 and 11; Fig. 13 is a section taken substantially on the line 13—13 of Fig. 3; Figs. 14, 15 and 16 are sections taken substantially on lines 14—14, 15—15 and 16—16 of Fig. 3; Fig. 17 shows the machine in left side elevation with side frame removed and base casting in section and handle drawn forward; and Fig. 18 is a detail section taken on the line 18—18 of Fig. 6; Fig. 19 is a similar view, same parts being shown under a different adjustment; Fig. 20 shows an example of work.

The adding and listing machine proper needs no extensive description as it is the well-known Burroughs machine exemplified in numerous prior patents. Reference may be had to British patent of the Burroughs Adding Machine Company, No. 16,800 of 1908, which illustrates an automatic cross-tabulating equipment applied to such type of adding and listing machine and further reference may be had to United States Patent No. 924,118, issued June 8, 1909, to said Burroughs Company on the invention of Jesse G. Vincent and myself, which shows an automatic double-column printing equipment applied to the same type of adding and listing machine. The cross-tabulating equipment illustrated in the accompanying drawings resembles in a number of particulars somewhat similar equipments fully shown and described in the above-specified patents so that not only is it unnecessary to refer to details of the adding and listing machine proper but also unnecessary to describe in detail some portions of the cross-tabulating equipment. It may be well to state at the outset that whereas said British patent shows the paper carriage arranged to be shifted from column to column by spring action and similarly returned and the aforesaid Vincent-Benner patent shows the paper carriage arranged to be moved back and forth between two columnar positions through connection with the prime mover of the machine in the form of an oscillating shaft, the present invention provides for shifting the carriage from column to column through connection with such prime mover and in opposition to a spring or springs, the latter being released after a predetermined number of columnar shifts of the carriage so that the same may be automatically returned to the position from which it started.

The back panel 2 of the supporting framework of the machine has secured to it the usual track 2ª upon which the carriage 3 runs, said carriage supporting the usual roller platen 4. Line spacing mechanism mounted upon said carriage is the same as shown in said Vincent-Benner patent. Then there is a rod 5 as in the construction shown in both patents above specified, which rod is journaled in depending portions of the carriage, extending from end to end thereof and held rocked one way by a spring 5ª, said rod carrying a series of stop fingers for determining the columnar positions of the carriage. Stop fingers of like general character appear in the aforesaid patents and are similarly adjustable along the rod 5, but those here shown differ in several respects to adapt them for the special purposes of the present invention, as will be described in detail hereinafter. Suffice it to state for the present that the carriage is shifted from column to column in opposition to its spring by action against certain of the stop fingers and that terminal stop fingers of the series serve to control devices presently to be described for releasing the spring and resetting the column shift mechanism.

The connections from the prime mover of the machine for impelling the carriage in opposition to its spring are of the following description: The familiar oscillating shaft 100, to which a power drive is commonly applied and which is cranked and linked to the hand-operated shaft, carries in the present instance a bevel gear segment 6 in mesh with a bevel pinion 7 (Fig. 3) secured on the inner end of a shaft 8 which is journaled in a bearing provided by the base casting of the machine. On the rear end of said shaft is fastened a crank 9 which is connected by a link or pitman 10 to a bar 11 guided in grooved sheaves or rollers 12 mounted on the back panel of the machine and the base casting, said bar adapted to be reciprocated crosswise the machine in each operation thereof since the crank 9 is half rotated first one way and then the other in an oscillation of the shaft 100. Normally the bar 11 stands over to the right as the machine would be viewed from the rear (Fig. 2) so that as the operating handle of the machine is pulled forward said bar is thrown to the left and as said handle returns to normal the bar returns to the right. To an upstanding ear 11ª of said bar there is pivoted a carriage-shifting dog or pawl 13, yieldingly held upward as to its acting end by a spring 14 which connects it with a detent or latch arm 15 also pivoted to the bar 11 (see Figs. 6 and 7), a forwardly-projecting stud 15ª on said latch arm being normally held by said spring in the lower one of two stepped depressions of an interior edge of the pawl 13, such lower depression being designated 13ª. It will be understood that the portion of the pawl 13 to the right of its pivot as viewed from the rear is widened considerably and open in the center. With the said stud 15ª in the lower depression 13ª, as in Fig. 7, the pawl is prepared to act in shifting the carriage from one columnar position to another. Normally the carriage would be over to the right as seen from the front of the machine or to the left as viewed from the rear and its then position determined by the engagement of one terminal stop finger 16 with the vertical shoulder of a beveled lug 17 on a plate 17ª slidably mounted against the back panel 2 and connected therewith by a pair of stout springs 17ᵇ, this plate constituting merely a buffer to cushion the impact when the carriage runs back to its original position. In order to avoid confusion I shall hereinafter use the terms "left" and "right", having reference to viewing the machine from the rear. The normal condition above referred to is illustrated in Fig. 7 and also in Figs. 9, 10 and 11 and the said terminal stop finger is further illustrated in perspective in Fig. 12. The buffer plate 17ª lies in a plane considerably forward of the pawl 13 and said stop finger is constructed to reach over the pawl and with a depending square end portion 16ª engage the said lug 17. Other peculiarities in the form of this terminal stop finger will be later pointed out in connection with other functions that it has to perform.

Stop fingers 18, secured upon the rod 5 at varying adjustments to the left of the terminal stop finger 16, are shorter than the latter and adapted to be acted upon by the pawl 13 to shift the carriage to the right. The form of these stop fingers is best illustrated in Fig. 8ª and it will be noted that they are somewhat enlarged at the forward end with relatively broad under-surfaces 18ª in a plane considerably below the horizontal axial plane of the rod 5, which distinguishes them as compared with the other terminal stop finger presently to be described. The distinction to be noted at present between these stop fingers 18 and the stop finger 16 is merely that they are shorter, not extending into the plane of the buffer plate 17ª and that their under-surfaces 18ª occupy an area to the rear of the somewhat similar though more abbreviated under-surface of the end portion 16ª of said finger 16, having an entirely different function to perform. With the carriage standing normally, i. e., with said finger 16 against the buffer plate lug and a middle beveled portion 16ᵇ of said finger 16 over the nose of the pawl 13 (this bevel not, however, performing any special function as so related to the pawl but under the conditions here referred to performing a function in connection with a different part later to be identified), under these conditions when the machine is operated and the bar 11 thrown to the left, said pawl will wipe under the next stop finger to the left, engaging the surface 18ª thereof and thereafter rising to a position where, upon return movement of the bar 11, the pawl will be driven against the left side of the enlarged portion or head of such finger 18 and thereby shift the carriage to the right. In such operation the relation between the pawl and the detent or latch plate 15 remains unchanged, such latch plate not coming into play until the final shift to the right has been effected and then serving a purpose which will presently be described. When the pawl rides under the finger 18 of course it does move relatively to the latch plate 15 but the movement is not sufficient to dislodge the pin or stud 15ª from the notch or seat 13ª whose right-hand wall or edge is elongated to provide for some play vertically against the said stud.

The above-described propulsion of the carriage to the right is in opposition to a spring tending constantly to drive the carriage to the left. In fact in the present instance there are two such springs working in concert, the purpose being to avoid difficulties in handling a single spring of the requisite size and also in finding room for such a spring. Referring to Figs. 1, 3 and 13 to 16 the reference numeral 20 designates a spring barrel which is secured to a vertical shaft 21 journaled in a bracket 22 which is secured to the inner side of the back panel 2 of the machine. A coiled spring 23 within said barrel is secured at its outer end to a lip struck inwardly from the barrel (see Fig. 16) and said spring is secured at its inner end to a sleeve 24 loose upon the shaft 21. Another spring barrel 25 loosely surrounds an upwardly-projecting portion of said sleeve and a coiled spring 26 within this barrel is secured at its inner end to said sleeve, as illustrated in Fig. 15, this spring 26 being coiled reversely to the spring 23 and secured at its outer end to a lip struck inwardly from the barrel 25. The latter has attached to its periphery a tape 27 (Fig. 13) adapted to wind upon it below a confining flange 28 and above the projecting portion of a circular plate 29 loose upon the sleeve 24 between the two barrels, said tape being attached to the carriage 3 at the right-hand end of the same. The two springs 23 and 26 are put under tension by rotating the shaft 21 which is equipped at its upper end with a handle 30 for the purpose. It will be obvious that right-hand turning of this handle will have the effect of winding the spring 23 from the outside by the turning of the barrel 20 and that the tightening of this spring and continued turning of the handle will turn the sleeve 24 and wind the upper spring 26 from the inside. It will likewise be obvious that sliding of the carriage to the right will rotate the upper barrel 25 winding the spring 26 from the outside, assuming the shaft 21 to be held against turning as it is through the medium of an escapement wheel 31 fastened to it and an escapement pallet 32 pivoted to the bracket 22 and having a suitable handle 33 by which to rock it and relieve tension of the springs when desired.

It will be obvious that the above-described arrangement of springs provides for propelling the carriage to the left under actuation of two coördinated springs or two springs arranged in tandem, with the advantage of securing as much power as needed under any conditions while economizing lateral space and doing away with difficulties in the handling of a spring of such length and size as would be required if but a single spring was employed, at the same time securing an improved spring action and obviating breakage and erratic action.

It will of course be obvious that the described propulsion of the carriage by the pawl 13 in opposition to the coiled springs, necessitates the employment of detaining means to hold the carriage at the columnar position to which it is so moved by the pawl. For such purpose a detent lever 40 (Fig. 6) is employed pivoted to the back panel of the machine and formed with a squared notch in which the head of a finger 18 may seat, as illustrated in Fig. 6. A spring 40ª connecting the left-hand arm of the lever 40 with the back panel of the machine, tends to elevate the notched end of the lever and lower the left-hand arm of said lever against a stop stud 41 on the back panel. There is an inclined edge of the detent lever 40 to the left of its notched end and when the carriage is propelled to the right by the pawl 13 in the manner described the undersurface 18ª of the finger 18, which said pawl is engaging, will ride over such inclined edge and depress the detent lever, stretching the spring 40ª until the finger 18 registers with the notch, whereupon the lever springs up, engaging its notch with the finger to prevent retrograde movement of the carriage. It is likewise important to prevent any overrunning of the carriage when propelled to the right and to this end a stop-piece 43 is pivoted to the back panel of the machine and normally upheld by a spring 43ª, against a bearing 2ᵇ on the back panel, as shown in Fig. 4, so that this stop-piece presents a vertical end edge 43ᵇ in the path of the finger 18, wherefore in the forcible propulsion of the carriage to the right by the pawl 13 said finger will land against such edge and then settle in the notch of the detent lever 40. It is of course essential that this pivoted stop-piece shall move out of the path of the stop finger when another shift of the carriage to the right is to take place and to this end a depending leg of the stop-piece carries a roller 43ᶜ normally underlying the rear end of a lever 92 whose primary function is to actuate line spacing mechanism hereinafter described and which lever in this connection performs similarly to the correspondingly designated lever in the Vincent-Benner patent. It engages a cam 95 on the shaft 100 and as the operating handle of the machine is drawn forward will be rocked to lower its rear end and consequently will displace the stop-piece 43, as illustrated in Fig. 6, taking it out of the path of the finger 18. While the said stop-piece will be restored in the back-stroke of the operating handle and it is during this same back-stroke that the pawl 13 acts to propel the carriage to the right, the engagement of the side of the lever 92 with the roller 43ᶜ is sufficiently prolonged to prevent restoration of the stop-piece until the finger 18 has moved above it. At the same time the lower edge of the said lever passes above the roller 43ᶜ while the said pawl 13 is in action, so as to insure restoration of the stop-piece in time to meet the oncoming finger, which may be one of the fingers 18 or a finger 44 secured to the rod 5 to the left of the series of fingers 18 (Fig. 13) and adapted to fix the final columnar position of the carriage. While this finger 44 serves the same purpose as the fingers 18 in providing a projection for the nose of the pawl 13 to act against in shifting the carriage and also the purpose of engaging the notch in the detent lever 40 to prevent retrograde movement of the carriage, it differs in function from said stop fingers 18 in the matter of control of line spacing mechanism, as will presently be explained.

Obviously in tabulating work where a series of amounts or numbers are to be printed one after another in a horizontal line, there should be no line spacing of paper in operations of the machine which print an amount or number and then shift the carriage to another columnar position. At the same time to provide for full automatic operation of the machine in repeatedly printing amounts or numbers in horizontal rows one below another so as to produce parallel vertical columns of imprints, the line spacing mechanism should be rendered effective after the last amount or number has been printed in a horizontal row. I have already stated that the line spacing mechanism mounted upon the paper carriage is the same as that illustrated in the Vincent-Benner patent, and I may now further state that the balance of the line spacing mechanism is similar in many respects to that there shown and that shown in the above-specified British patent. Thus the line spacing bail rod 84 is embraced by jaws 86 at the upper end of a slide strip or bar 87 superposed upon another slide strip or bar 89 having jaws 90 extending under said bail rod, the two slide strips or bars being mounted upon the back panel of the machine and the bar 89 pivotally connected to the aforesaid lever 92 so as to be reciprocated in every operation of the machine. A coupler latch 60 is pivoted to a lower portion of the slide strip or bar 87 (Fig. 6) and has a forwardly-turned flange 60ª which a spring 61, applied to the lower end of the latch, tends to hold below a rearwardly-turned flange 89ª of the slide strip or bar 89 so as to connect the two slide strips or bars and cause them to be reciprocated together to effect line spacing. The latch, however, is adapted to be displaced by the detent lever 40 when either the terminal stop finger 16 or any one of the intermediate stop fingers 18 is engaged with said detent lever. Thus the latter has a depending portion with an under-edge 40ᵇ extending at such an angle that depression of the right-hand arm of said detent lever, to a certain extent, will cause displacement of the latch by the action of said edge 40ᵇ against a stud 62 thereon, as illustrated in Fig. 8, whereas with said detent lever not so depressed the latch may swing over to the left to bring its flange 60ª below the flange 89ª as illustrated in Fig. 4. Now the bevel 16ᵇ of the terminal stop finger 16 normally engages the upper right-hand corner of the detent lever 40, as illustrated in Fig. 9, depressing the same sufficiently to displace the latch 60, with the result that upon operation of the machine to print an amount in the first columnar position no line spacing will occur because the flange 89ª will pass down to the left of the flange 60ª. The same thing is true when the carriage is in positions determined by the intermediate stops 18 for, as before stated, the under-surfaces 18ª thereof are considerably below a horizontal axial plane of the rod 5 and they therefore hold the detent lever 40 so far depressed as to disable the latch, as illustrated in Fig. 8.

To insure against lowering of the strip or bar 87 in any such case the upper portion of the latch 60 is made in the form of a hook 60ᶜ which is adapted when the latch is so displaced to engage over a fixed pin 80, here shown as upon a nut confining the slide strips or bars. Of course when the detent lever 40 rises upon disengagement therefrom of the finger 16 or one of the fingers 18 at the beginning of a lateral shift of the carriage, its under-edge 40ᵇ would no longer restrain the latch but the flange 89ª will have then passed down to the left of the flange 60ª and not only prevents recovery of the latch but, as the parts are here shown related, will force the latch slightly farther to the right, bringing its hook 60ᶜ into closer engagement with the pin 80. Then when the detent lever 40 is depressed by engagement of the oncoming stop finger with its inclined top edge, the under-edge of said lever will again engage the stud 62 before the flange 89ª has risen above the flange 60ª, so that the latch will continue to be held displaced and the line spacing mechanism will remain disabled. There is an extended lower edge 40ᶜ of the lever 40 substantially concentric with the pivot of said lever and so being at an angle to the edge 40ᵇ, the junction of these edges being rounded off and the result being that when the detent lever 40 is depressed beyond the extent to which it is held down by the finger 16 or one of the fingers 18, (as when such fingers are wiping over it) the edge 40ᶜ will ride upon the stud 62 maintaining the desired relation between the detent lever and said stud so that when the detent lever rises upon registry of its notch with the finger the right-hand portion of the edge 40ᵇ will return to engagement with the stud 62 to keep the latch displaced. Now the acting portion of the stop finger 44 does not have the same vertical dimension as acting portions of the stop fingers 18 or in other words the under-surface 44ª of stop finger 44 is not so far below the horizontal axial plane of the rod 5 as may be observed by comparison of Figs. 3, 4 and 6 with Figs. 8 and 8ª. The result is that though said finger 44 in wiping over the detent will maintain the latch displaced and the line-spacing mechanism disabled, yet when the acting portion of the finger has passed the upper corner of the detent and registers with the notch thereof, the detent can and does rise sufficiently to permit the latch 60 to swing over to left taking its flange 60ª under the flange 89ª, and so with the carriage in the final columnar position line spacing will ensue upon the backward stroke of the operating handle. It will be noted that at all times except when the carriage is in the final columnar position the line-spacing mechanism remains disabled, the hooked end of the latch 60 being continually held to the right as viewed from the rear.

To avoid the possibility of the hooked end of the latch 60 getting under the stud 80 the latch is elongated above the hook shoulder so as to ride along the stud and a guard flange 60ˣ is provided on a plate 60ʸ fastened to the back panel of the machine, as illustrated in Fig. 4, the flange 60ª of the latch adapted to pass down to the left of said flange 60ˣ, as illustrated in Fig. 18, when the upper end of the latch is about to pass below the stud 80.

In the same operation which prints the last amount in a horizontal row and effects line spacing in the manner above described, the carriage will be returned to its original position by the coiled springs hereinbefore described. It is of course essential to the accomplishment of this that both the actuating pawl 13 and the detent lever 40 shall be displaced sufficiently to take them out of the path of the stop finger 44 and the stop fingers 18. In the construction here shown the pawl is so displaced as the handle is drawn forward but of course the detent lever must continue to hold the carriage set for the printing in the last column and so this detent lever is not displaced until the operating handle is on its way back to normal. It is in connection with the displacement of the pawl that the before-mentioned latch arm 15 comes into play to hold the said pawl displaced during the return movement of the carriage, by reason of the stud 15ª becoming lodged in the upper notch 13ᶜ of the interior edge of the pawl. To provide for the displacement of the pawl now being considered there is secured to or formed upon its hub a cam-piece 13ᵈ inclined on the upper edge and having an abrupt left-hand edge with the junction between these edges rounded. Then there is adjustably secured to the rod 5 leftward beyond the column stop finger 44 a collar 70 having a lug 70ª on its underside (Fig. 2) adapted to stand in the path of the cam-piece 13ᵈ when the carriage has moved to the last columnar position, the lug being a short distance to the left of the cam-piece, (see Fig. 4). The result is that when the handle is drawn forward and the bar 11 shifted to the left the abrupt edge of the cam-piece will encounter said lug 70ª and the cam-piece will wipe under said lug, being depressed thereby sufficiently to rock the pawl 13 downward carrying its notch 13ᶜ below the stud 15ª of the latch arm 15, whereupon said latch arm swings to the right, its said stud lodging in said notch as illustrated in Fig. 6, thus holding the pawl depressed out of line with the column stop finger 44 and the fingers 18. Now for the purpose of displacing the detent lever 40 the left-hand arm thereof carries a roller stud 40ᵈ which normally overlies the radial edge 73ª of a rocker plate 73 pivoted to the back panel of the machine and having a tangential edge 73ᵇ at the left and a concentric edge 73ᶜ extending from the radial edge to a shoulder which, with the lower portion of the tangential edge, forms a projecting finger 73ᵈ normally above the line of travel of a roller stud 13ᵉ at the extremity of the left-hand arm of the pawl lever 13. Said rocker plate is held in normal position by a spiral spring 74 connecting it with a stud on the back panel of the machine, the spring pulling in a line radial to the rocker piece and thus holding the latter in what may be termed a central position. The pawl lever 13 having been displaced as described and being held displaced by the latch lever 15 at an early stage in the forward pull of the operating handle will have its roller stud 13ᵉ in line with the finger 73ᵈ of the rocker plate as the forward pull of the operating handle continues, with the result that said roller stud will wipe past said finger, rocking the plate to the left against the tension of the spring 74 which, upon escape of the roller stud past the finger, will restore the plate to its original position so that its radial edge 73ᵇ will then be in the path of return travel of the stud 13ᵉ, (Fig. 6). Then when the operating handle returns and the bar 11 is moved to the right said stud will act upon said radial edge and rock the plate to the right, (Fig. 7), causing its radial edge 73ª to engage the roller stud 40ᵈ and thereby rock the detent lever 40 until said stud lands upon the concentric edge 73ᶜ. This rocking of the detent lever is sufficient to disengage it from the finger 44 and carry it down out of line with the fingers 18 so that immediately upon such displacement of the detent lever the carriage is run back by its springs until the terminal finger 16 strikes the lug of the buffer plate 17ª. Just as the operating handle comes to the end of its backward swing or just as the bar 11 comes to the end of its movement to the right the roller stud 13ᵉ escapes past the finger 73ᵈ, whereupon the rocker plate 73 is restored to normal position by its spring 74 and the detent lever 40 is rocked back by its spring 40ª until its nose strikes the inclined under-surface 16ᵇ of the terminal stop finger 294, as shown in Fig. 9. Of course the rocking of the detent lever 40 by the rocker plate 73 effects disablement of the line spacing mechanism by action upon the stud 62 of the latch 60 and then as has been before stated the engagement of the beveled surface 16ᵇ of the terminal stop finger 16 with the detent lever will keep said latch 60 displaced so that in the next operation of the machine there will be no line spacing.

It is of course necessary to continued cross-tabulating work that, the carriage having been returned to original position, the pawl lever 13 shall be released so as to be ready to effectively engage the first of the stop fingers 18 in the next ensuing operation of the machine. For this purpose there is pivoted upon the latch arm 15 a tappet finger 75 extending up past the stud 15ª to the right of the same and held against it by a spiral spring 75ª connecting a branch of the tappet finger with a lower portion of the latch arm 15, as shown in Fig. 7. On the underside of the hub of the terminal column stop finger 16 there is formed a square lug 16ᵈ which, when the carriage runs back to its original position, is adapted to strike the tappet 75 and thereby rock the latch arm 15 to the left, disengaging its stud 15ª from the upper notch or shoulder 13ᶜ of the pawl lever 13, whereupon the spring 14 swings the said detent upward as to its right-hand portion, resetting it for renewed shifting of the carriage.

It will be understood that when the carriage is being returned by its springs the stop fingers 18 will ride over the inclined upper edge of the stop-piece 43, depressing the latter in opposition to its spring, and that the terminal stop finger 16 also rides over this stop-piece before reaching the lug of the buffer plate 17ª but that then the stop-piece will rise to effective position at the right of said stop finger 16 for preventing any undue rebound of the carriage and for properly fixing the first columnar position thereof.

It will be noted that on the terminal stop finger 16 and the intermediate stop fingers 18 there are shown rollers 821ª. They are for the purpose of eliminating accumulation or addition when the paper carriage is in any one of the columnar positions determined by said stop fingers, though these rollers are detachable and may be left off altogether or attached to one or another or any desired number of stop fingers according to the tabulating work in hand. As here shown, with the rollers attached to the above specified stop fingers, only the amounts printed in the last column would be added, but of course the work in hand might call for cross-addition of all amounts printed in a horizontal line or two or more such amounts and it might be that there should be no addition of the last column. This is not a new proposition in the art of cross-tabulating equipments for adding and listing machines and reference may be had to Patent No. 929,056, issued July 27, 1909, to Burroughs Adding Machine Company on the invention of J. G. Vincent, where column stop fingers adjustable along a rod are shown and described as equipped with detachable rollers for performing the same eliminating function, the rollers being there shown attached to the under sides of the stop fingers whereas in the present instance the rollers are shown attached to the rear sides of the stop-fingers. The connections for effecting elimination are correspondingly modified. Thus a lever 821$^b$ is arranged at the back of the machine (see Fig. 2), shiftable in a vertical plane and having one end formed for engagement by the rollers 821$^a$, the other end of the lever resting upon a roller stud 821$^c$ on the reciprocating bar 11, so that normally the lever does not stand ready to be vibrated by the rollers. This lever is secured to the rear end of a shaft journaled in the bearing 2$^a$ and having secured to its forward end in front of the back panel 2 an arm 821$^d$. The latter is engaged with a lever 821$^e$ pivoted to the frame-work (Fig. 17) and spring-actuated to abut a shaft 501. The forward end of said lever is formed to interfere with the familiar wipe-pawl 821 and normally stands ready to do so and will do so in such manner as to prevent said wipe-pawl rocking the frame 913 to engage the accumulator pinions 916 with the racks 610, if when the operating handle starts back in an operation of the machine one of the roller-equipped column stop fingers has been fixing the position of the carriage, for in such case the roller prevents the rocking of the lever 821$^b$ which would otherwise take place upon the shifting of the bar 11 to the extreme left-hand position. The normal engagement of the roller 821$^c$ with said lever 821$^b$ holds up the right-hand arm of the latter and thereby the arm 821$^d$ so that the forward end of the lever 821$^e$ will be held depressed in the path of the stud on the wipe pawl 821, as illustrated in Fig. 17. In the case above supposed, the roller 821$^a$ continues in engagement with the lever 821$^b$ as the operating handle starts back, until the roller 821$^c$ has again come into engagement with the other arm of said lever. Consequently the lever 821$^b$ will remain positioned to disable the wipe-pawl 821. If, on the other hand, the column stop-finger fixing the position of the carriage does not have the roller, then the lever 821$^b$ will be rocked by the spring which is applied to the lever 821$^e$ as soon as the roller 821$^c$ disengages from the lever 821$^b$ in movement of the bar 11 to the left. This rocking of the lever 821$^b$ is of course accompanied by rocking of the lever 821$^e$ and the latter will thus be lifted at its forward end sufficiently to let the wipe-pawl 821 thereon perform its customary function of engaging the adding pinions with their racks. It will be noted that at all times except when the carriage is in the final columnar position the line-spacing mechanism remains disabled, the hooked end of the latch 60 being continually held to the right as viewed from the rear.

To avoid the possibility of the hooked end of the latch 60 getting under the stud 80 the latch is elongated above the hook shoulder so as to ride along the stud and a guard flange 60$^x$ is provided on a plate 60$^y$ fastened to the back panel of the machine, as illustrated in Fig. 4, the flange 60$^a$ of the latch adapted to pass down to the left of said flange 60$^x$, as illustrated in Fig. 18, when the upper end of the latch is about to pass below the stud 80.

What I claim is:

1. In a machine of the character described, the combination of a laterally shiftable paper carriage, a reciprocating prime mover, means for directly shifting the carriage step by step by said prime mover in one direction of movement thereof and in successive operations thereof, and means for automatically returning the carriage to its original position, as an incident to operation of the prime mover when a predetermined number of such step-by-step movements have ensued.

2. In a machine of the character described, the combination of a laterally shiftable paper carriage, a reciprocating prime mover, means for directly shifting the carriage step by step by said prime mover in one direction of movement thereof and in successive operations thereof, a spring opposed to such movement, and means for automatically rendering said spring effective, after a predetermined number of shifts of the carriage, to return the latter to its original position.

3. In a machine of the character described, the combination of a laterally shiftable paper carriage, a prime mover, means for shifting the carriage step by step by said prime mover in successive operations thereof, a spring opposed to such movement, a detent for holding the carriage at successive positions against the stress of said spring, and means for automatically disabling the detent after a predetermined number of shiftings of the carriage by the prime mover.

4. In a machine of the character described, the combination of a laterally shiftable paper carriage, a prime mover, a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; and means for thereafter disabling said detent, whereby the spring may take effect to return the carriage to its original position.

5. In a machine of the character described, the combination of a laterally shiftable paper carriage, a prime mover, a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; a detent for holding the dog or pawl so displaced; and means for disabling the first mentioned detent by the said dog or pawl in its displaced adjustment, to permit the spring to thereupon return the carriage to its original position.

6. In a machine of the character described, the combination of a laterally shiftable paper carriage, a prime mover, a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; a detent for holding the dog or pawl so displaced; means for displacing the first mentioned detent by the said dog or pawl in its displaced adjustment, to permit the spring to thereupon return the carriage to its original position; and means for tripping the second-mentioned detent upon the arrival of the carriage at such original position.

7. In a machine of the character described, the combination of a laterally shiftable paper carriage, a prime mover, means for shifting the carriage step by step by said prime mover in successive operations thereof, a movable stop member to limit the step by step movement of the carriage; means for retracting and restoring said stop member in each operation of the prime mover; and means for automatically returning the carriage to its original position as an incident to operation of the prime mover when a predetermined number of such step by step movements have ensued.

8. In a machine of the character described, the combination of a laterally shiftable carriage, a prime mover, means for shifting the carriage step by step by said prime mover in successive operations thereof; a spring opposed to such movement; a movable stop member to limit movement of the carriage in opposition to said spring; means for retracting and restoring said stop member in each operation of the prime mover; and means for automatically returning the carriage to its original position as an incident to operation of the prime mover when a predetermined number of such step by step movements have ensued.

9. In a machine of the character described, the combination of a laterally shiftable paper carriage, a prime mover, means for shifting the carriage step by step by said prime mover in successive operations thereof, a spring opposed to such movement; a movable stop member to limit movement of the carriage in opposition to said spring; means for retracting and restoring said stop member in each operation of the prime mover; a detent for holding the carriage at successive positions against the stress of said spring, and means for automatically disabling the detent after a predetermined number of operations of the prime mover.

10. In a machine of the character described, the combination of a laterally shiftable paper carriage, a prime mover, a member reciprocated in an operation of said prime mover and carrying a dog or pawl to propel the carriage; an opposed spring; a movable stop member to limit movement of the carriage in opposition to said spring; means for retracting and restoring said stop member in each operation of the prime mover; a detent for holding the carriage against said spring; means for displacing the dog or pawl in operation of the prime mover following its propulsion of the carriage to the last of a predetermined number of positions; and means for then disabling said detent, whereby the spring may take effect to return the carriage to its original position.

11. In a machine of the character described, the combination of a laterally shiftable paper carriage; a prime mover; a member reciprocated in an operation of said prime mover and carrying a dog or pawl to propel the carriage; an opposed spring; a movable stop member to limit movement of the carriage in opposition to said spring; means for retracting and restoring said stop member in each operation of the prime mover; a detent for holding the carriage against said spring; means for displacing the dog or pawl in operation of the prime mover following its propulsion of the carriage to the last of a predetermined number of positions; a detent for holding the dog or pawl so displaced; and means for disabling the first mentioned detent by the said dog or pawl in its displaced adjustment, to permit the spring to thereupon return the carriage to its original position.

12. In a machine of the character described, the combination of a laterally shiftable paper carriage, a prime mover, a member reciprocated in an operation of said prime mover and carrying a dog or pawl to propel the carriage; an opposed spring; a movable stop member to limit movement of the carriage in opposition to said spring; means for retracting and restoring said stop member in each operation of the prime mover; a detent for holding the carriage against said spring; means for displacing the dog or pawl in operation of the prime mover following its propulsion of the carriage to the last of a predetermined number of positions; a detent for holding the dog or pawl so displaced; means for disabling the first mentioned detent by the said dog or pawl in its displaced adjustment, to permit the spring to thereupon return the carriage to its original position; and means for tripping the second mentioned detent upon the arrival of the carriage at such original position.

13. In a machine of the character described, the combination of a laterally shiftable paper carriage, a prime mover, means for shifting the carriage step by step by said prime mover in successive operations thereof, means for automatically returning the carriage to its original position, as an incident to operation of the prime mover when a predetermined number of such step-by-step movements have ensued; line spacing mechanism normally disabled; and means for enabling the same in the last of the operations of the prime mover which effect the step-by-step movements of the carriage.

14. In a machine of the character described, the combination of a laterally shiftable paper carriage, a prime mover, means for shifting the carriage step by step by said prime mover in successive operations thereof; a spring opposed to such movement, a detent for holding the carriage at successive positions against the stress of said spring; line spacing mechanism normally disabled by said detent; means for enabling the same by changed adjustment of the detent resulting from the last of a predetermined number of carriage shifting operations of the prime mover; means for disabling the detent as to carriage detaining function by a following operation of the prime mover; and means for restoring said detent to effective adjustment for both detaining the carriage and disabling the line-spacing mechanism, as a result of the return of the carriage by the spring to original position.

15. In a machine of the character described, the combination of a laterally shiftable paper carriage, a prime mover, a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; line spacing mechanism normally disabled by said detent; means for enabling said mechanism by changed adjustment of the detent incidental to propulsion of the carriage to said last position; means for disabling the detent as to carriage detaining function by the following operation of the prime mover; and means for restoring said detent to effective adjustment for both detaining the carriage and disabling the line-spacing mechanism, as a result of the return of the carriage by the spring to original position.

16. In a machine of the character described, the combination of a laterally shiftable paper carriage, a prime mover, a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; a detent for holding the dog or pawl so displaced; line spacing mechanism normally disabled by the first mentioned detent; means for enabling said mechanism by changed adjustment of the detent incidental to propulsion of the carriage to said last position; means for disabling said first mentioned detent as to carriage detaining function by the said dog or pawl in its displaced position in the following operation of the prime mover; and means for restoring said detent to effective adjustment for both detaining the carriage and disabling the line-spacing mechanism, as a result of the return of the carriage by the spring to original position.

17. In a machine of the character described, the combination of a laterally shiftable paper carriage; a prime mover; a member reciprocated in an operation of said prime mover and carrying a dog or pawl to propel the carriage; an opposed spring; a detent for holding the carriage against said spring; means for displacing the dog or pawl in operation of the prime mover following its propulsion of the carriage to the last of a predetermined number of positions; a detent for holding the dog or pawl so displaced; line-spacing mechanism normally disabled by the first mentioned detent; means for enabling said mechanism by changed adjustment of the detent incidental to propulsion of the carriage to said last position; means for disabling said first mentioned detent as to carriage detaining function by the said dog or pawl in its displaced position in the following operation of the prime mover; means for restoring said detent to effective adjustment for both detaining the carriage and disabling the line-spacing mechanism, as a result of the return of the carriage by the spring to original position; and means for tripping the second mentioned detent upon the arrival of the carriage at such original position.

18. In a machine of the character described, the combination of a laterally shiftable paper carriage, a prime mover, means for shifting the carriage step-by-step by said prime mover in successive operations thereof; a movable stop member to limit the step-by-step movement of the carriage; means for retracting and restoring said stop member in each actuation of the prime mover; line-spacing mechanism normally disabled; and means for enabling the same in the last of the operations of the prime mover which effects the step-by-step movement of the carriage.

19. In a machine of the character described, the combination of a laterally shiftable paper carriage; a prime mover; means for shifting the carriage step by step by said prime mover in successive operations thereof; a movable stop member to limit the step-by-step movement of the carriage; line-space mechanism normally disabled; a line-space mechanism actuator serving also to retract and restore the said movable stop; means for enabling the line-space mechanism in the last of the operations of the prime mover which effect a predetermined number of shifts of the carriage; and means for automatically returning the carriage to its original position by the following operation of the prime mover and re-disabling the line-spacing mechanism.

20. In a machine of the character described, the combination of a laterally shiftable paper carriage; a prime mover; means for shifting the carriage step by step by said prime mover in successive operations thereof; a spring opposed to such movement; a detent for holding the carriage at successive positions against the stress of said spring; line-spacing mechanism normally disabled by said detent; means for enabling the same by changed adjustment of the detent resulting from the last of a predetermined number of carriage shifting operations of the prime mover; means for disabling the detent as to carriage-detaining function by the next operation of the prime mover; means for restoring said detent to effective adjustment for both detaining the carriage and disabling the line-spacing mechanism, as a result of the return of the carriage by the spring to original position; a movable stop member confronting the detent to limit movement of the carriage in opposition to the spring; and a line-space mechanism actuator adapted to retract and restore said stop member.

21. In a machine of the character described, the combination of a laterally shiftable spring held paper carriage; an oscillatory prime mover; a reciprocating bar connected therewith; a pivoted spring held pawl on the bar, and a detent on the bar to engage the pawl, said pawl adapted to shift the carriage against the latter's spring and the carriage having a projection to displace the pawl after a predetermined number of shifts.

22. In a machine of the character described, the combination of a laterally shiftable spring held paper carriage; an oscillatory prime mover; a reciprocating bar connected therewith; a pivoted spring held pawl on the bar, and a detent on the bar to engage the pawl, said pawl adapted to shift the carriage against the latter's spring and the carriage having a projection to displace the pawl after a predetermined number of shifts; and a projection to displace the pawl detent upon return of the carriage to original position under actuation of its spring.

23. In a machine of the character described, the combination of a laterally shiftable spring held paper carriage; an oscillatory prime mover; a reciprocating bar connected therewith; a pivoted spring held pawl on the bar, and a detent on the bar to engage the pawl and carrying a wiper tappet; the pawl adapted to shift the carriage against the latter's spring and the carriage having a projection to displace the pawl after a predetermined number of shifts and a projection to act upon the wiper tappet upon return of the carriage to original position under actuation of its spring.

24. In a machine of the character described, the combination of a laterally shiftable spring held paper carriage; an oscillatory prime mover; a reciprocating bar connected therewith; a pivoted spring held pawl on the bar, a detent on the bar to engage the pawl, and a spring-held detent to hold the carriage in positions to which it is moved by the pawl in opposition to the carriage spring; the carriage having a projection to displace said pawl after a predetermined number of shifts and the pawl when held by its detent so displaced, adapted in continued operation of the prime mover, to displace the carriage detent; and the carriage having a projection to displace the pawl-detent when the carriage is returned to original position by its spring as a result of said displacement of the pawl and the carriage detent.

25. In a machine of the character described, the combination of a laterally shiftable spring-held paper carriage; an oscillatory prime mover; a reciprocating bar connected therewith; a pivoted spring-held pawl on the bar, a detent on the bar to engage the pawl, a spring-held detent to hold the carriage in positions to which it is moved by the pawl in opposition to the carriage spring, and a rocker to displace said detent; the carriage having a projection to displace said pawl after a predetermined number of shifts and the pawl when held by its detent so displaced, adapted in continued operation of the prime mover, to operate the aforesaid rocker and thereby displace the carriage detent; and the carriage having a projection to displace the pawl-detent when the carriage is returned to original position by its spring as a result of said displacement of the pawl and the carriage detent, the pawl thereupon disengaging from the rocker to permit restoration of the carriage detent.

26. In a machine of the character described, the combination of a laterally shiftable spring-held paper carriage; an oscillatory prime mover; a reciprocating bar connected therewith; a pivoted spring held pawl on the bar, and a detent on the bar to engage the pawl, the carriage having a series of adjustable projections, one or more for the pawl to act upon, and one to displace the pawl.

27. In a machine of the character described, the combination of a laterally shiftable spring-held paper carriage, an oscillatory prime mover, a reciprocating bar connected therewith, a pivoted spring held pawl on the bar, and a detent on the bar to engage the pawl, the carriage having a series of adjustable projections, one or more for the pawl to act upon, and one to displace the pawl detent upon return of the carriage to original position by its spring.

28. In a machine of the character described, the combination of a laterally shiftable spring held paper carriage, an oscillatory prime mover, a reciprocating bar connected therewith, a pivoted spring held pawl on the bar, and a detent on the bar to engage the pawl and carrying a wiper tappet, means for tripping the second-mentioned detent upon the arrival of the carriage at such original position; the carriage having a series of adjustable projections, one or more for the pawl to act upon, and one to displace the pawl detent by acting upon said tappet when the carriage is returned to original position by its spring.

29. In a machine of the character described, the combination of a laterally shiftable spring-held paper carriage, an oscillatory prime mover, a reciprocating bar connected therewith, a pivoted spring held pawl on the bar, a detent on the bar to engage the pawl, and a spring-held detent to hold the carriage in positions to which it is moved by the pawl in opposition to the carriage spring; the carriage having a series of adjustable column stop pieces to engage said detent, certain of said pieces adapted to be acted upon by the pawl to shift the carriage; and one of the pieces being adapted to displace the pawl, the latter then displacing the carriage detent; substantially as and for the purpose described.

30. In a machine of the character described, the combination of a laterally shiftable spring held paper carriage; an oscillatory prime mover; a reciprocating bar connected therewith; a pivoted spring held pawl on the bar, a detent on the bar to engage the pawl, and a spring-held detent to hold the carriage in positions to which it is moved by the pawl in opposition to the carriage spring; the carriage having a series of adjustable column stop pieces to engage said detent, certain of said pieces adapted to be acted upon by the pawl to shift the carriage; and one of the pieces being adapted to displace the pawl, the latter then displacing the carriage detent and another of the pieces adapted to displace the pawl detent when the carriage is returned to original position by its spring.

31. In a machine of the character described, the combination of a laterally shiftable spring held paper carriage; an oscillatory prime mover; a reciprocating bar connected therewith; a pivoted spring held pawl on the bar, a detent on the bar to engage the pawl, a spring-held detent to hold the carriage in positions to which it is moved by the pawl in opposition to the carriage spring; and line-spacing slides one reciprocated by the prime mover and the other having a latch to connect it to the first under control of the said detent; the carriage having adjustable column stop pieces to engage the latter, certain of them displacing it sufficiently to displace the line space latch and one permitting the latch to couple the slides together, and certain of said pieces adapted to be acted upon by the pawl.

32. In a machine of the character described, the combination of a laterally shiftable spring held paper carriage; an oscillatory prime mover; a reciprocating bar connected therewith; a pivoted spring held pawl on the bar, a detent on the bar to engage the pawl, a spring held detent to hold the carriage in positions to which it is moved by the pawl in opposition to the carriage spring; and line-spacing slides one reciprocated by the prime mover and the other having a latch to connect it to the first under control of the said detent; the carriage having adjustable column stop pieces to engage the latter, certain of them displacing it sufficiently to displace the line space latch and one permitting the latch to couple the slides together, and certain of said pieces adapted to be acted upon by the pawl to shift the carriage, and one of the pieces adapted to displace the pawl and one of the pieces which disables the slide coupling latch, adapted to displace the pawl detent.

33. In a machine of the character described, the combination of line spacing slides; a prime mover connected to one of them for reciprocating it; a spring-held coupling latch on the other; a laterally shiftable carriage having a series of column stop pieces projecting horizontally and varying as to downward extent; and a detent for engaging the stop pieces to hold the carriage in columnar position, said detent adapted to displace the coupling latch when stop pieces of the greater downward extent engage it.

34. In a machine of the character described, the combination of a laterally shiftable paper carriage; a prime mover; a member reciprocated in an operation of said prime mover and carrying a dog or pawl to propel the carriage; adding pinions; racks; means for moving said pinions out of and into engagement with the racks including a wipe pawl; an arm for disabling the latter; a lever operatively connected to said arm and normally engaged by the aforesaid reciprocating member; and one or more projections on the carriage adapted to engage the lever; substantially as and for the purpose described.

RUSSELL E. BENNER.

Witnesses:
R. S. MIELERT,
J. G. VINCENT.